United States Patent [19]

Rossman

[11] Patent Number: 5,184,510
[45] Date of Patent: Feb. 9, 1993

[54] LIQUID LEVEL SENSOR

[75] Inventor: Michael D. Rossman, Canton, Mich.

[73] Assignee: Ford Motor Company, Dearborn, Mich.

[21] Appl. No.: 812,326

[22] Filed: Dec. 23, 1991

[51] Int. Cl.⁵ .................. G01F 23/28; G01C 25/00
[52] U.S. Cl. .................................. 73/290 V; 73/1 H
[58] Field of Search ............... 73/290 V, 291, 1 H; 33/377, 378

[56] References Cited

U.S. PATENT DOCUMENTS

| | | | |
|---|---|---|---|
| 3,354,554 | 11/1967 | Panerai et al. | 33/377 X |
| 3,693,445 | 9/1972 | Johnson | 73/290 V |
| 3,895,964 | 7/1975 | Sakamoto | 73/291 X |
| 3,968,687 | 7/1976 | Fester | 73/291 |
| 4,170,765 | 10/1979 | Austin et al. | |
| 4,210,969 | 7/1980 | Massa | |
| 4,229,798 | 10/1980 | Rosie et al. | |
| 4,337,656 | 7/1982 | Rapp | 73/290 V |
| 4,403,502 | 9/1983 | Lindt | 73/290 V |
| 4,427,132 | 1/1984 | Thomson | |
| 4,487,065 | 12/1984 | Carlin et al. | |
| 4,840,137 | 6/1989 | Beauvais et al. | |
| 5,083,383 | 1/1992 | Heger | 33/377 X |

*Primary Examiner*—Daniel M. Yasich
*Attorney, Agent, or Firm*—Richard D. Dixon; Roger L. May

[57] ABSTRACT

An apparatus and method for measuring the level of a liquid within a storage tank, including a target for being buoyantly supported near the surface of the liquid and an acoustic sensor for measuring the distance between a tank reference point and the target. The motion of the target induced by any change in level of the liquid is restrained along a known path so that the target distance is representative of the level of the liquid within the tank.

17 Claims, 3 Drawing Sheets

LIQUID LEVEL SENSOR

BACKGROUND OF THE INVENTION

1. Field of the Invention

The present invention relates to an apparatus and method for measuring the level of a liquid in a tank or container. More specifically, the present invention relates to the use of an ultrasonic or acoustic transducer for sensing the level of the liquid within the container.

2. Description of the Prior Art

It is often necessary to measure the level of a liquid in a tank or reservoir under conditions which preclude normal measurement techniques. For example, the liquid may be stored under conditions of high temperature or humidity, or the liquid itself may be highly combustible or may emit fumes or odors. Also, the configuration of the container may be such that it is not practical to place the sensor in a position where it is generally perpendicular to the level of the liquid, and thus a somewhat indirect method of measuring the level of the liquid must be used.

Rosie et al in U.S. Pat. No. 4,229,798 discloses the use of an ultrasonic transducer for measuring the vertical height of a liquid in a tank. His invention also includes means for compensating for the change in velocity of propagation of the ultrasonic waves within the tank as the temperature of the liquid and the vapors above the liquid change. A microprocessor based system is utilized for calculating the volume of the liquid within the tank based upon measurement of the distance from the top of the tank to the fluid, and thereafter adjusting for errors induced by temperature, etc. However, the inventor recognizes that the use of a capacitive sensor would be preferable to an ultrasonic sensor when the tank containing the liquid is tilted (e.g., in mobile tankers) such that the beam from the ultrasonic transducer may not arrive perpendicular to the surface of the liquid.

Austin et al in U.S. Pat. No. 4,170,765 utilizes an ultrasonic pulse transducer which is mounted within one end of a pipe that is then extended into a fluid such that the ultrasonic pulses propagate along the cavity of the tube in a direction generally perpendicular to the surface of the liquid. A reflection target, such as a discontinuity in the tube above the liquid surface, is used to provide an echo (or calibration signal) which arrives back at the ultrasonic sensor before the reflection from the surface of the liquid. In this manner the calibration signal can be analyzed for changes induced by environmental conditions such as temperature, humidity and pressure of the gaseous medium above the liquid.

Massa in U.S. Pat. No. 4,210,969 utilizes a small disk target which is suspended within the tank above the level of the liquid. The disk is illuminated by an ultrasonic transducer so as to provide a self-calibrating signal used by the computer for automatically correcting for errors in measurement of the distance from the transducer to the surface of the liquid, such as those which would occur as a result of variations of the velocity of sound in the space above the liquid.

It should be noted that the aforementioned references are designed for use in stationary storage tanks, such as water or fuel reservoirs, that are not subject to movement when measurements are being taken. Neither of the references identify or address the problem of using ultrasonic waveforms directed toward the surface of the liquid from a direction other than perpendicular, or when the tank is moving and subject to surface irregularities (such as standing surface waves or the like).

SUMMARY OF THE INVENTION

It is an object of the present invention to provide a system for measuring the level of a liquid within a container or vessel using an ultrasonic sensor.

The invention utilizes a sphere which is buoyantly supported by the liquid so as to represent a target of generally constant cross-sectional area for the ultrasonic sensor. The use of the spherical target allows the sensor to operate in situations where the axis of the ultrasonic sensor does not intersect the surface of the liquid at a perpendicular angle. The spherical target moves within an elongated chamber defined by a tube, one end of which is immersed into the fluid.

Self-calibration limits are provided for restraining the motion of the sphere within the elongated chamber, whereby the fixed limits of travel of the sphere simulate calibrated levels of the liquid as sensed by the ultrasonic sensor.

BRIEF DESCRIPTION OF THE DRAWINGS

Other objects, features and advantages of the present will be apparent from the study of the following drawings.

DETAILED DESCRIPTION OF THE PREFERRED EMBODIMENT

Figure 1:
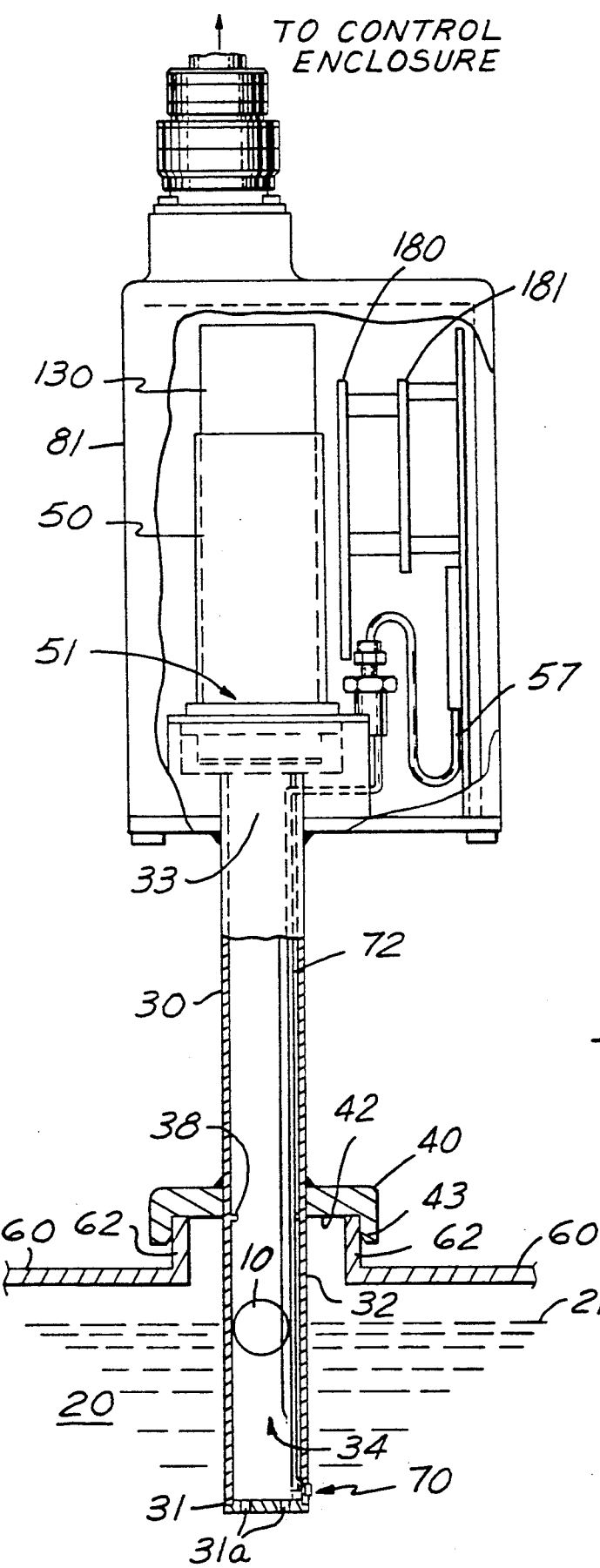
FIG. 1 illustrates a cutaway frontal view of a first preferred embodiment of the ultrasonic liquid measurement sensor in accordance with the present invention.

The first preferred embodiment of the present invention is shown generally in FIG. 1 as including a spherical ball or target, shown as reference numeral 10, which floats on the surface 21 of the liquid 20. The floating ball 10 moves within a cavity 34 defined within a frame or guide tube 30. The first end 31 of the tube 30 is extended into and below the surface 21 of the fluid 20 so that the ball 10 will float at a Position spaced above the first end 31 of the tube 30. A second section 32 of the tube 30 is spaced above the surface 21 of the fluid 20. A second end 33 of the tube 30 has connected thereto an ultrasonic ranging sensor, designated by reference numeral 50, that generally operates by projecting a focused beam of acoustical pulses down a longitudinal axis of the cavity 34 defined within the tube 30. Reflections of the acoustical wave from the surface of the sphere 10 are received by the ultrasonic sensor 50, with the time differential between the transmission of the acoustic wave and the reception of the reflected wave being directly proportional to the distance of the ball 10 from the ultrasonic sensor 50.

The tube 30 and the ultrasonic sensor 50 are maintained in a fixed relationship to the reservoir 60 by a collar 40. An inside section 42 of the collar 40 provides a circumferential surface and lip 43 that couples with a corresponding lip or collar section 62 of the vessel 60.

The inside surface of the collar 62 defines an access port into the tank 60. Any type of a snug connection between collar sections 40 and 62 will be sufficient as long as the position of the tube 30 within the fluid 20 is maintained relatively constant.

Figure 5:
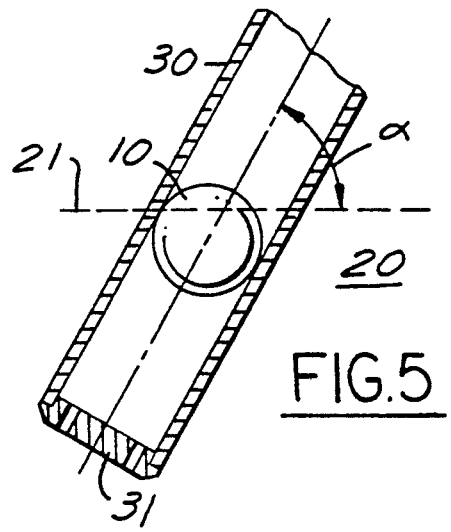
FIG. 5 illustrates the ultrasonic sensor being inserted into the liquid at a non-perpendicular angle.

In the first preferred embodiment of the present invention the spherical ball 10 is formed of a thin plastic substance and includes a hollow, air filled central core. Thus, the specific gravity of the ball 10 is substantially less than the specific gravity of the liquid 20, thereby causing the ball 10 to float on the surface 21. The effective mass or specific gravity of the ball 10 is a design parameter that may be changed in accordance with the requirements of each particular application. For example, if the container 60 is subjected to substantial movements during the time when measurements are being taken, it may be desirable to increase the mass or specific gravity of the ball 10 such that a substantial portion of the exterior surface of the ball rides below the surface 21 of the liquid 20 (see for example FIG. 5). This increase in effective mass of the ball 10 acts as a mechanical integrator (or damper) for any wave or surface motions of the liquid 20, thereby reducing many of the abrupt motions of the ball 10 in response to movement of the container 60 and the liquid 20 therein.

While in the first preferred embodiment the exterior surface of the ball 10 is formed of the same plastic material that is used for constructing the main mass of the ball, it may be possible and in some circumstances desirable to coat the surface of the ball 10 with other materials to enhance the durability or reflective characteristics of the ball.

The exterior surface of the ball 10 is in close proximity to the interior surface of the tubular housing 30 such that the clearance will minimize any hysteresis effects. Also, sufficient clearance should be provided such that any liquid 20 that is trapped in the cavity 34 on the upper side of the ball 10 can quickly drain toward the lower end 31 of the tubular housing 30. The liquid 20 enters and drains from the first end 31 of the tubular housing 30 through apertures 31A that are sufficiently large and spaced so as to provide an even flow of the liquid even when the sphere 10 is at the lower extremity of the tubular housing 30. In effect, the inside surface of the first end 31 of the tubular housing 30 acts as a stop or limit to the downward excursion of the ball 10.

The ultrasonic sensor 50 uses a piezoelectric crystal which resonance to a desired frequency and thereby converts electrical energy into acoustic energy. The acoustic pulse is transmitted from the ultrasonic sensor 50 and after being reflected from the ball 10 is received by the piezoelectric crystal. The pressure wavefront from the received ultrasonic pulse causes the piezoelectric crystal to emit an electrical signal which is characteristic of the waveform and pressure of the received wavefront. The ultrasonic sensor 50 is typically of the ranging measurement type and is capable of detecting the location of the floating ball 10 from a minimum of four inches to a maximum of ten inches from the sensor depending on the sensor type and generating a location signal responsive thereto. In the first preferred embodiment of the present invention the ultrasonic sensor 50 may be either model RPS-425A-12 or model RPS-425PW-12 manufactured by Migatron Corp. of LaGrange, Ill. 60525.

With continuing reference to FIG. 1, a temperature sensor 70 is attached adjacent the first end 31 of the tubular housing 30 so as to be generally immersed in the liquid 20. The temperature sensor 70 comprises a thermistor or equivalent temperature sensor that is accurate to $+/-4$ degrees Fahrenheit over the range of $-4°$ Fahrenheit $\sim 1800°$ Fahrenheit. The electrical output signal from the temperature sensor 70 is coupled to an electrical cable 72 which is carried by the tubular housing 30.

Figure 3:
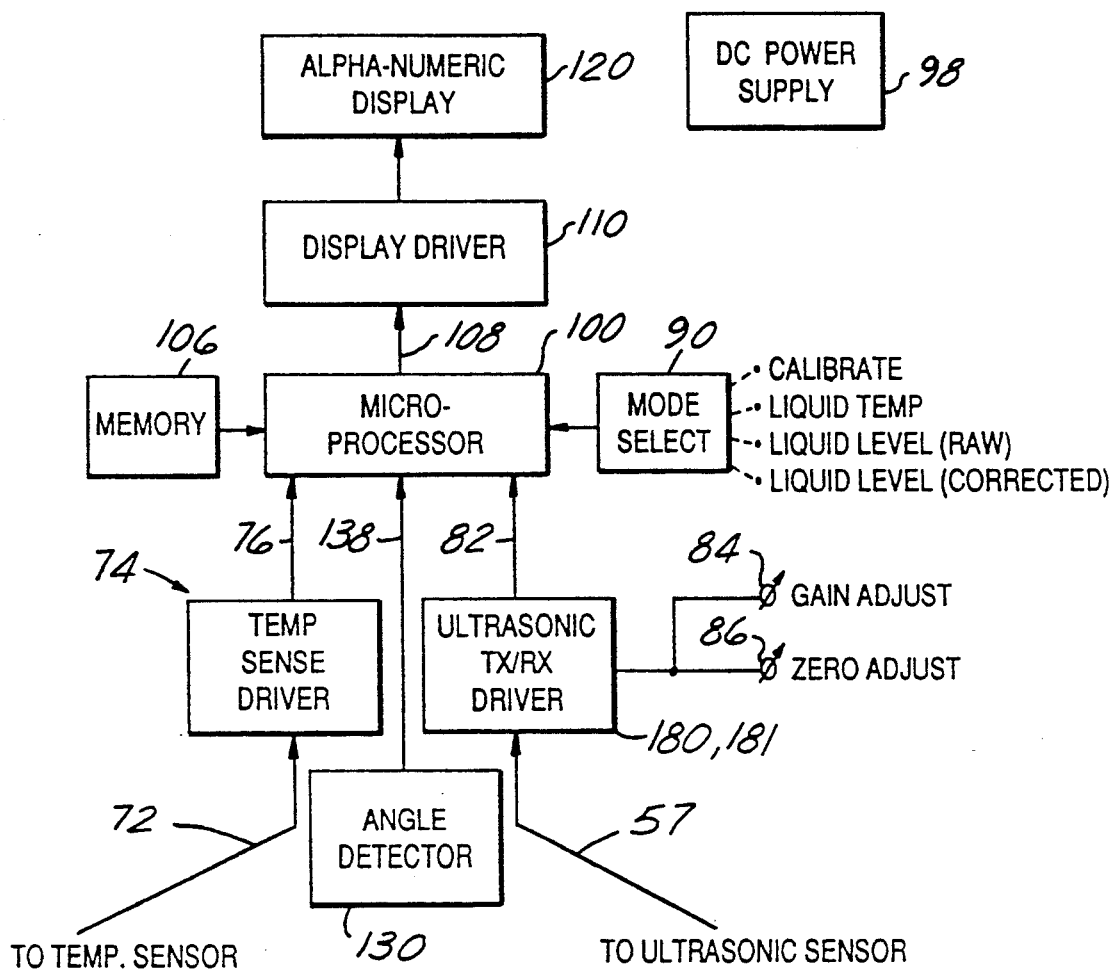
FIG. 3 is a schematic block diagram of the electronics used to drive the ultrasonic sensor and display the results of the measurement.

With reference to the schematic block diagram of the ultrasonic level sensor shown in FIG. 3, the cable 72 is then connected to a temperature sensing driver 74 which supplies the electrical current to the temperature sensor 70 and responsive to any change in temperature of the liquid 20 detects the change in output voltage and/or current. The temperature sensor driver 74 is commonly known and used in the electronics industry and generally is specified by the manufacturer of the temperature sensor 70 so as to be compatible therewith.

The output 76 of the temperature sensing driver 74 is coupled to one input of a microprocessor controller 10 which is used for performing mathematical computations. In the first preferred embodiment the microprocessor of choice is the 68HC11 CMOS microprocessor manufactured by Motorola Inc. of Phoenix, Ariz. This microprocessor 100 is coupled to appropriate memory 106 for storing the software code used to drive the microprocessor, as well as the data received by and processed by the microprocessor. An output 108 of the microprocessor 100 is coupled to a display driver 110 which in turn is coupled to an alphanumeric display 120, typically of the liquid crystal display (LCD) type. Also, a dc power supply 98 is provided for supplying the required power to each of the circuit elements discussed herein. However, for the sake of clarity, FIG. 3 does not illustrate all of the connections between the dc power supply, which may be either a battery or a rectified ac power supply, and the various circuitry disclosed herein.

Figure 2:
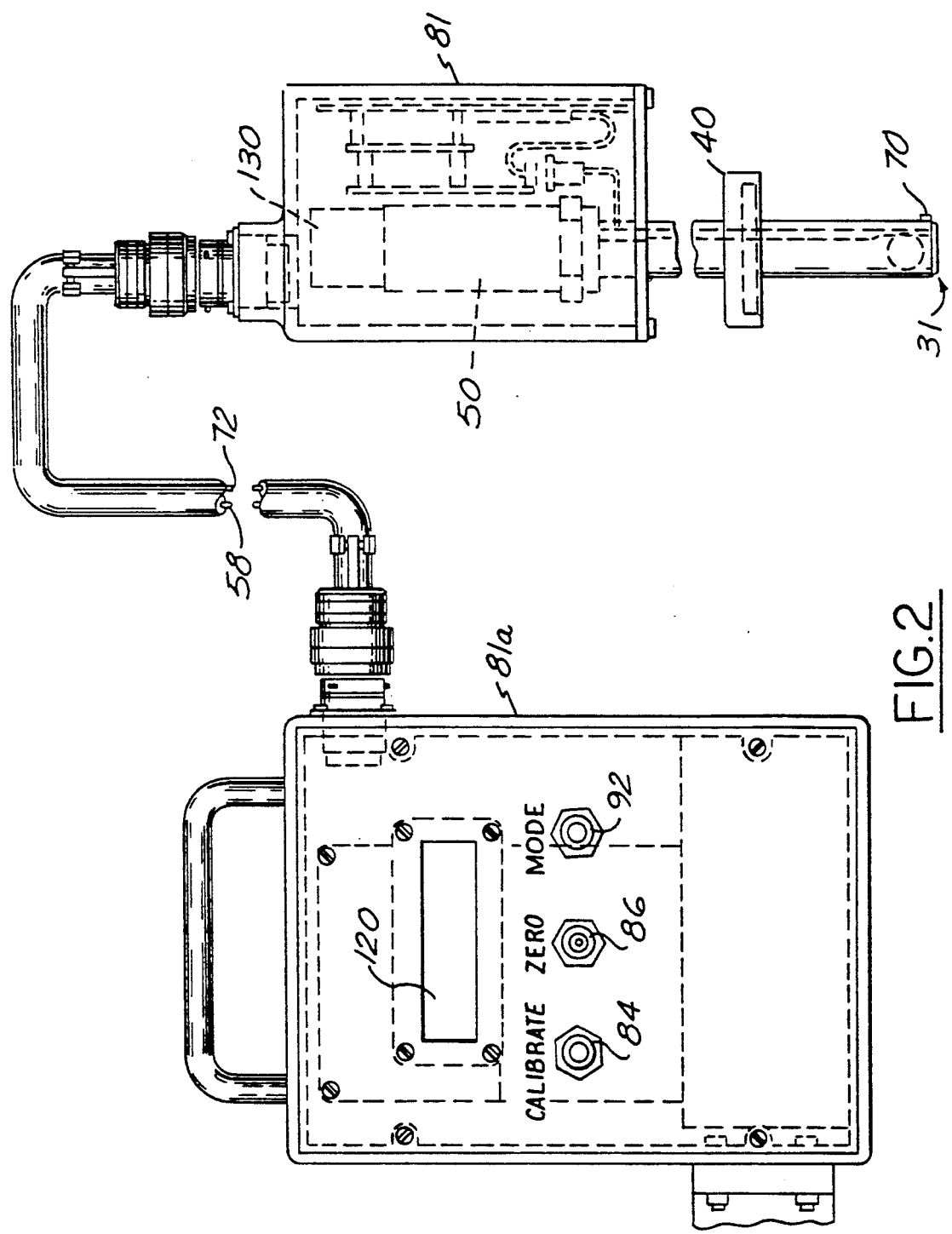
FIG. 2 illustrates the ultrasonic measurement sensor and measurement system.

With reference to FIGS. 1, 2 and 3, the signal output from the ultrasonic sensor 50 is coupled by signal cable 57 to ultrasonic transmitter/receiver driver circuit boards 180, 181 contained within the portable housings 81 and 81a. The ultrasonic TX/RX driver boards are generally chosen to be compatible with the specific ultrasonic sensor 50. In the present case the ultrasonic TX/RX driver board is manufactured by Migatron Corp. of LaGrange, Ill. as model RPS-8000A. This driver board is able to control up to eight ultrasonic sensors by using time division multiplex techniques for switching among the sensors. Outputs from transmitter/receiver driver circuit boards are coupled to driver circuitry, a microprocessor and displays 120 contained within a remote housing 80a.

With continuing reference to FIG. 3, output voltages and sensitivities are adjustable by potentiometer 84 between four volts (at 10 cm.) to ten volts (at 25 cm.). Also, a zero (or bias) adjustment Potentiometer 86 is provided for setting the output of the ultrasonic TX/RX drivers 180, 181 to the equivalent of zero volts (or some other reference voltage) when the ball 10 is located at a neutral or calibration position. In this manner variations in the position of the ball 10 from the calibrated position within the tubular housing 30 may be represented as either a positive or negative voltage (depending upon the distance and direction of displacement) with an adjustable gain.

The output of the ultrasonic TX/RX drivers 180, 181 is coupled to an input of the microprocessor 100. Also coupled to an input of the microprocessor 100 is a mode select function switch shown generally as 90. This mode select control allows the operator to instruct the microprocessor 100 to enter into the calibration subroutine. The normal operating mode will display the liquid temperature, a liquid level (for raw liquid levels) and an adjusted liquid level (corrected for temperature variations). Each of these values is derived by running various software/firmware subroutines in the microprocessor 100. Since microprocessor software, including a subroutine of this type, is well known to practitioners in this art, and may be generally available from ultrasonic sensing/control manufacturers for use with their sensors, no specific discussion of software and/or firmware will be presented herein.

The microprocessor 100 may also be programmed, depending upon the characteristic shape and volume of the tank 60 containing the liquid 20, to display not only the level of the liquid surface 20 within the tank 60, but also to convert this level into a volume occupied by the liquid by using an algorithm which converts the detected level to a volume for the given container 60. Either look-up tables or volumetric calculations (liquid height times cross-sectional area) may be used to perform these calculations in the microprocessor 100. Nonlinear relationships between the liquid height and the liquid volume may be used through algorithms in the microprocessor 100. The resulting volume may be adjusted by the microprocessor calculations as a function of temperature from the sensor 70.

With continuing reference to FIGS. 1 and 3, reference numeral 130 designates a sensor for detecting the angle included between the longitudinal axis of the tubular housing 30 (and/or the ultrasonic sensor 50) and the surface 21 of the liquid 20. The output 138 of this angle detector 130 may also be coupled to another input of the microprocessor 100 so that well known trigonometric functions can be utilized to convert the nonvertical distance measured by the ultrasonic sensor 50 to the ball 10 into a vertical measurement corresponding to a distance between a reference point on the tank 60 (such as the collar 62) and the surface 21 of the liquid 20. The angle detector 130 will allow the microprocessor 100 of the liquid level sensing system to automatically adjust and compensate for a variety of different angles (shown as α) at which the first end 31 of the tubular housing 30 may be inserted into the liquid 20 (see FIG. 5).

Figure 4:
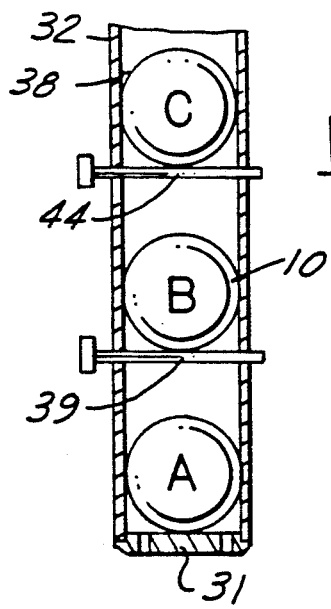
FIG. 4 illustrates the self-calibration feature of the first preferred embodiment of the present invention.

The operation of the ultrasonic liquid level sensor will now be illustrated with reference to FIGS. 1, 3 and 4. Prior to use, the sensor must be calibrated by following a setup procedure. First, the ultrasonic liquid level sensor is removed from the liquid. The tubular housing 30 with the attached ultrasonic sensor 50 is rotated so the first end 31 is pointing in the vertical or upward direction. The calibration pins 39,44 are inserted into the housing 30. The tubular housing 30 is rotated 180° so the first end 31 is pointing in the downward direction. This orientation causes the ball 10 to be gravitationally Pulled against the calibration pin 44 at position C (as shown functionally in FIG. 4). The calibration switch 92 is depressed thereby instructing the microprocessor 100 that the current ultrasonic sensor output for position C is equivalent to a known displacement.

Next, calibration pin 44 is removed from the apertures allowing the ball 10 to fall into calibration position A in the tubular housing 30. In this position, the midpoint of the measurement range is checked to correct for linearity deviation of the ultrasonic sensor output.

Next, calibration pin 39 is removed from the apertures allowing the ball 10 to fall into calibration position B adjacent to first end 31 of the tubular housing 30. This corresponds to the minimum level or volume to be detected by the sensor.

The zero control 86 (or bias control) on the ultrasonic TX/RX driver 80 is adjusted in the initial setup to control the minimum sensing limit of the ultrasonic sensor. The gain control 84 of the ultrasonic TX/RX driver 80 is adjusted in the initial setup to control the sensing limit for maximum displacement of the ultrasonic sensor.

It should not be necessary to adjust the temperature sensor driver 74 or the angle detector 130 since these adjustments should not deviate in a magnitude that would significantly change the resulting level/volume indicators.

While specific embodiments of the invention have been shown and described in detail to illustrate the application of the principles of the invention, it will be understood that the invention may be embodied in other forms and embodiments without departing from such principles.

I claim:

1. A system for measuring the level of a liquid contained within a storage tank, comprising in combination:
    a target for being buoyantly supported by the liquid within the tank;
    guide means for coupling to and guiding the movement of said target as it is displaced by any change in level of the liquid, said guide means including a first end thereof for being inserted into the liquid and a second end spaced therefrom so as to be outside of the liquid;
    position calibration means coupled to said guide means and comprising a first stop means adjacent said first end and a second stop means spaced adjacent said second end so as to define calibrated limits of travel for said target as it moves along said guide means;
    said guide means is removably coupled with the tank for allowing gravitational displacement and calibration of said target against said first stop means and against said second stop means; and
    sensing means coupled to said guide means an in a known spatial relationship with the tank for acoustically sensing the distance to said target as it moves between said first and said second stop means, and thereby measuring the level of the liquid therein.

2. The liquid measuring system as defined in claim 1 wherein said guide means includes a longitudinal axis defined between said first end and said second end, with said target traversing along said longitudinal axis in response to the change in level of the liquid in the tank.

3. The liquid level measuring system as defined in claim 2 wherein said target is buoyantly supported near the surface of the liquid.

4. The liquid level measuring system as defined in claim 3 wherein said target defines a uniform cross-section that is always directed toward said sensing means.

5. The liquid level measuring system as defined in claim 4 wherein said target comprises a sphere.

6. The liquid level measuring system as defined in claim 2, wherein said guide means includes a frame for defining therein an elongated chamber having said longitudinal axis along which said target moves in response to the change in level of the liquid.

7. The liquid measuring system as defined in claim 2 wherein said acoustic sensing means is located along said longitudinal axis.

8. The liquid measuring system as defined in claim 2 further including display means for calculating and displaying a representation of the distance from said sensing means to said target.

9. The liquid level measuring system as defined in claim 8 further including means for calculating the volume of the liquid within the tank as a function of the position of said target therein.

10. The liquid level measuring system as defined in claim 9 further including first means for sensing the temperature of the liquid, and wherein said volume calculating means is coupled to said first means for calculating a corrected volume of the liquid as function of the temperature.

11. The liquid level measuring system as defined in claim 1 further including means for sensing the angle included between a longitudinal axis of said guide means and the surface of the liquid and responsive thereto generating an angle signal, and angle correction means coupled to said sensing means and said angle sensing means for using said angle correction signal for calculating the travel of said target in a direction perpendicular to the surface of the liquid.

12. The liquid level measuring system as defined in claim 1 wherein the specific gravity of said target is greater than that of the liquid, thereby allowing it to float mostly submerged so as to integrate small movements in the surface of the liquid.

13. A system for measuring the level of a liquid contained within a storage tank, comprising in combination:
 a target for being buoyantly supported by the liquid within the tank:
 a frame for defining therein an elongated chamber having a first end thereof submerged in the liquid for guiding therein the movement of said target in response to any change in the level of the liquid,
 position calibration means coupled to said frame, comprising a first calibration stop means adjacent said first end and a second calibration stop means spaced adjacent a second end of said chamber so as to define calibrated limits of travel for said target as it moves within said frame,
 and guide means removably coupled with the tank for allowing gravitational displacement and calibration of said target against said first stop means and against said second stop means,
 acoustic sensing means coupled in a known spatial relationship with said frame and the tank for acoustically sensing the distance to said target as it moves between said first and second calibration stop means and generating a location signal responsive thereto, and
 computation means coupled to said acoustic sensing means for calculating the level of the liquid within the tank.

14. The liquid level measuring system as defined in claim 13 further including:
 temperature sensing means, coupled to said computation means and immersed in the liquid for generating a temperature signal responsive thereto, and
 wherein said computation means includes means for converting said location signal to a volume occupied by the liquid, and means for correcting the calculated volume of the liquid responsive to said temperature signal.

15. A method for measuring the level of a liquid within a storage tank, comprising the steps of:
 buoyantly supporting a target adjacent the surface of the liquid in the tank,
 guiding the movement of said target within a guide and along a known path in response to any change in level of the liquid,
 acoustically sensing the distance from the tank reference point to said target and generating a distance signal responsive thereto,
 converting said distance signal to provide a level signal representative of the level of the liquid with respect to the tank reference point, and
 initially calibrating said distance signal by
 removing said guide from the storage tank,
 gravitationally moving said target against a first stop adjacent a first end of said guide,
 gravitationally moving said target against a second stop spaced from said first end, and
 inserting said guide into said storage tank such that said first and second stops are maintained at a known spacing from said reference point.

16. The liquid measuring method defined in claim 15 further including the step of:
 converting said distance signal to a volume signal representative of the volume of the liquid in the tank as a function of the level of the liquid.

17. The liquid measuring method defined in claim 15 further including the steps of:
 generating a temperature signal responsive to the temperature of the liquid, and
 correcting said volume signal responsive to said temperature signal, for eliminating any temperature induced errors in the volume signal.

* * * * *